Sept. 17, 1963   R. C. STRAUSS   3,103,828
STARTER CONTROL
Original Filed Dec. 3, 1952
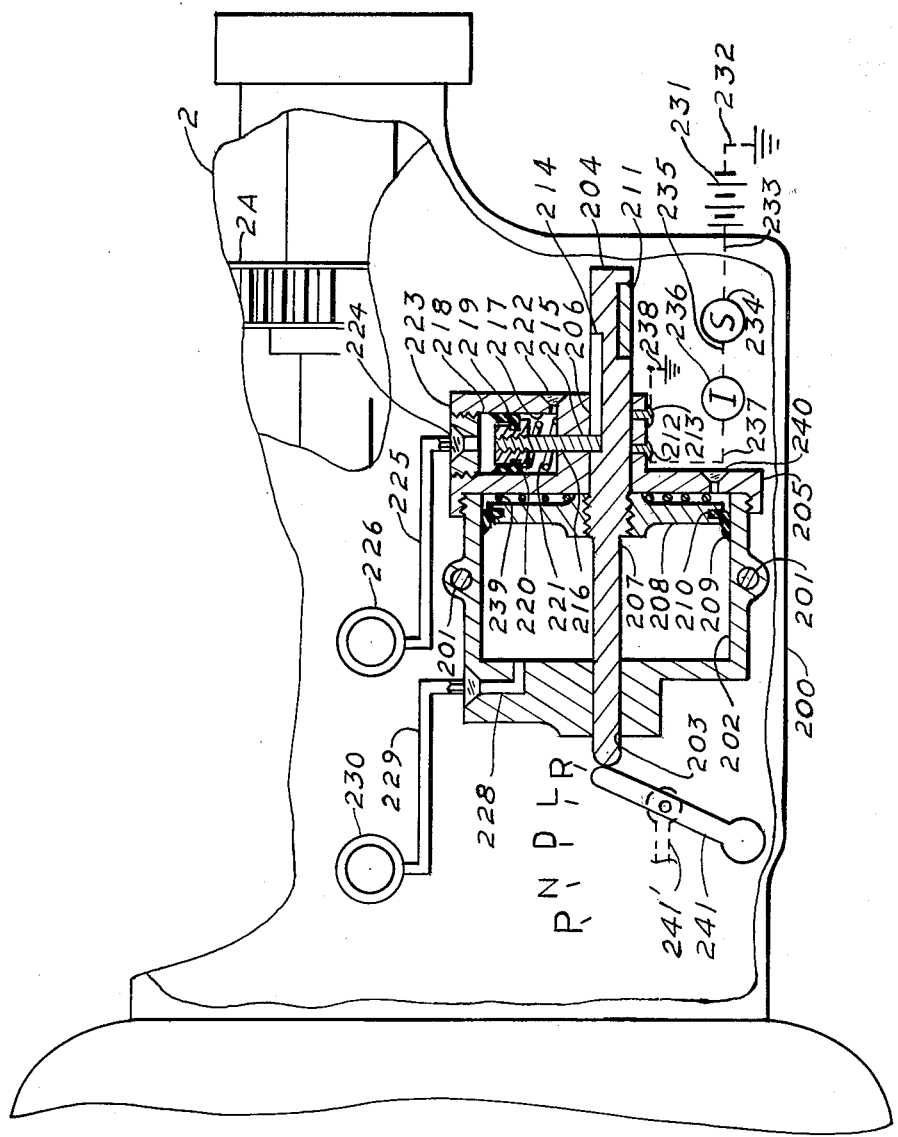
INVENTOR.
BY Ray C. Strauss

United States Patent Office 3,103,828
Patented Sept. 17, 1963

3,103,828
STARTER CONTROL
Raymond C. Strauss, 301 W. Lenawee, Lansing, Mich.
Application Apr. 24, 1957, Ser. No. 654,700, now Patent No. 2,960,200, which is a continuation of application Ser. No. 323,787, Dec. 3, 1952. Divided and this application Mar. 14, 1960, Ser. No. 14,997
1 Claim. (Cl. 74—472)

This invention relates to motor vehicles having change speed transmissions and particularly to a device for positioning the transmission selector lever at an out-of-gear position so that the motor may be started in safety.

The principal object of this invention is to improve the construction and operation of the out-of-gear positioning and starting mechanism shown in my Patent Number 3,035,563. This application is a division of Serial Number 654,700, filed April 24, 1957, now Patent Number 2,960,200, which application was a continuation of Serial Number 323,787, filed December 3, 1952, now abandoned.

The drawing is a sectional view of a hydraulically actuated, hydraulically pressured latch controlled form of the device, carried within an automatic transmission as an operating part thereof.

The drawing shows a form of the out-of-gear positioning and restarting mechanism wherein hydraulic pressures developed by the pumps within the automatic transmission itself are utilized to cock the out-of-gear positioning shaft and to shift a piston to block the movement of the shift lever into parking position.

A cylindrical casting 200, which may be carried externally of the transmission as an accessory, is here shown to be housed within transmission 2 and attached thereto by bolts 201 so that it is made an operable part of the transmission along with such other parts as gear train 2A shown to be partly revealed in another compartment of the transmission. Casting 200 has drilled at the axial center of cylindrical area 202 a bearing opening 203 to receive electrically non-conducting shaft 204. Electrically non-conducting end cap 205 is threaded to the open end of casting 200 and carries at its axial center bearing opening 206 for the opposite end of shaft 204. Shaft 204 at shoulder 207 is threaded to receive piston 208 on the rim of which rides piston ring 209 snapped into groove 210 for contact with cylindrical area 202. Shaft 204 at one point on its surface has embedded therein electrically conducting insert 211 for registry with terminal screws 212 and 213, and has at another point elongated groove cut 214 for cooperation with piston rod 215 riding perpendicular thereto in bearing opening 216 of end cap 205. Opening 216 enlarges at its upper end into cylindrical area 217 in which rides piston ring 218 snapped into rim groove 219 of piston 220 which is threaded to the upper end of piston rod 215. A spring 221 bears against the lower wall of area 217, carrying a port 222, and against the undersurface of piston 220. End cap 223 threads into the upper end of cylindrical area 217, and has put through its axial center port 224 threaded to receive tubing 225 connecting with the customary driveshaft driven rear pump 226 of the automatic transmission 2, said pump being of the variety that will produce a pressure when the driveshaft rotates either clockwise or counterclockwise and shall produce at least a moderate pressure in tubing 225 under very low vehicle speed conditions, preferably ½ mile per hour or less.

L-shaped port 228 in casting 200 at the end opposite to end cap 205 communicates with cylindrical area 202 and is threaded to connect with tubing 229 joined to the customary motor driven front pump 230 of the automatic transmission 2, said pump producing a pressure in tubing 229 as soon as the motor becomes self-operating. Battery 231, grounded through lead 232, connects through lead 233 to starter 234, lead 235 connecting starter 234 to ignition switch 236, and lead 237 connecting ignition switch 236 with terminal screw 212, terminal screw 213 being grounded through lead 238.

A spring 239 bears between the upper surface of piston 208 and the inner surface of end cap 205. A port 240 communicates the inner and outer surfaces of end cap 205 to connect either by tubing or directly with the oil reservoir area of transmission 2, port 222 being arranged in the same manner. The shaft 204 is aligned to abut shift lever 241, connected externally through link 241', here shown in broken lines, to the steering column mounted manual selector lever (not shown).

In the operation of the mechanism so far described, it is obvious that the motor of the vehicle is in operation as evidenced by the fact that the front pump 230 has forced oil through tubing 229 into cylindrical area 202 behind piston 208 to compress spring 239 and move shaft 204 to the right end limits of its travel so that it has been possible for the driver to manually position shift lever 241 in reverse. It is also obvious that the vehicle is moving backward as evidenced by the fact that rear pump 226 has forced oil through tubing 225 into the upper section of cylindrical area 217 behind piston 220 to compress spring 221 and move shaft 215 into engagement with elongated groove 214 to prevent ejection of shift lever 241 by shaft 204 into parking.

If, now, the motor stalls while the vehicle is moving backwardly, pressure from the front pump 230 in tubing 229 will disappear and spring 239 will be free to drive piston 208 and shaft 204 away from end cap 205, moving shift lever 241 as far as neutral position at which location electrically conducting insert 211 closes the starter circuit between terminal screws 212 and 213 for immediate cranking and restarting of the motor and subsequent return of piston 208 and cap 205, whereupon shift lever 241 will be freed for manual return to an in-gear position. If the vehicle stops moving before the motor has been restarted, pressure from rear pump 226 will disappear and spring 221 will be free to lift shaft 215 from engagement with groove cut 214, permitting spring 239 to move piston 208 and shaft 204 to the leftward limits of their travel, thereby forcing shift lever 241 into parking position. Since insert 211 is long enough to continue contact with terminal screws 212 and 213, the starter 234 will continue cranking the motor until the motor is restarted whereupon piston 208 will again be moved toward cap 205 and the starter circuit will be broken so that shift lever 241 may again be manually moved to an in-gear position. Instead of pump 230, the oil pump of the motor, the water pump, or the like, producing fluid pressure only while the motor is in operation, may be substituted.

At any time the ignition switch 236 is turned to "off" the shift lever 241 will, after the motor stops, be ejected, if in-gear, to neutral, and after the vehicle stops moving it will be moved to parking. In either neutral or parking position, when the ignition switch 236 is turned to "on," the motor will again be started and shift lever 241 will be freed for manual in-gear positioning.

I claim:

In a motor vehicle having an automatic transmission with a selector shift member movable to different positions for positioning the transmission in park, neutral, and drive conditions, said vehicle having an engine and having an engine operated power source that operates only when the engine is running and which stops when the engine stops running, said vehicle having a low-speed pump means that operates to deliver pressure at speeds of approximately one-half mile per hour and less and which stops when the vehicle stops moving, a safe starting device for automatically positioning the shift member in neutral position when the engine stops running and the vehicle is moving and for automatically positioning the shift member in park position when the engine stops running and the vehicle stops moving, said device comprising a movable shaft member adapted to engage said shift member and drive it to said neutral and park positions, spring means operatively connected to said shaft member to provide the force for moving it when the shaft member engages said shift member to drive the shift member to said neutral and park positions, shaft member holding means operatively connected to and powerized by said power source for holding said shaft member out of driving engagement with the shift member when the engine is running, said shaft member holding means releasing said shaft member for movement by the spring means when the engine and power source stop, shaft member movement limiting means operatively connected to and powerized by said pump means for limiting the shaft member's movement of the shift member to only the neutral position when the vehicle is moving, said shaft member movement limiting means releasing said shaft member for movement by the spring means to park position when the vehicle stops moving, and circuit means for restarting the engine including switch means connected to and operated by said shaft member and located to be closed so that the circuit is operative to restart the engine when the shaft member drives the shift member to neutral and park positions.

References Cited in the file of this patent

UNITED STATES PATENTS

| | | |
|---|---|---|
| 2,426,234 | Naracher et al. | Aug. 26, 1947 |
| 2,960,081 | Strauss | Nov. 15, 1960 |
| 2,960,200 | Strauss | Nov. 15, 1960 |